(12) United States Patent
Bellows et al.

(10) Patent No.: US 8,219,745 B2
(45) Date of Patent: Jul. 10, 2012

(54) MEMORY CONTROLLER TO UTILIZE DRAM WRITE BUFFERS

(75) Inventors: Mark David Bellows, Rochester, MN (US); Kent Harold Haselhorst, Byron, MN (US); Ryan Abel Heakendorf, Rochester, MN (US); Paul Allen Ganfield, Rochester, MN (US); Tolga Ozguner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1731 days.

(21) Appl. No.: 11/002,556

(22) Filed: Dec. 2, 2004

(65) Prior Publication Data

US 2006/0123187 A1 Jun. 8, 2006

(51) Int. Cl.
*G06F 12/00* (2006.01)
(52) U.S. Cl. .. 711/105; 711/142; 711/143; 711/E12.001
(58) Field of Classification Search .................. 711/142, 711/143
See application file for complete search history.

(56) References Cited

U.S. PATENT DOCUMENTS

| | | | | |
|---|---|---|---|---|
| 4,569,034 A | * | 2/1986 | Findley et al. | 711/126 |
| 4,792,926 A | * | 12/1988 | Roberts | 365/189.02 |
| 5,226,126 A | * | 7/1993 | McFarland et al. | 712/218 |
| 5,561,783 A | * | 10/1996 | Vanka et al. | 711/141 |
| 5,781,927 A | * | 7/1998 | Wu et al. | 345/535 |
| 5,809,228 A | * | 9/1998 | Langendorf et al. | 714/53 |
| 6,151,658 A | * | 11/2000 | Magro | 711/110 |
| 6,553,448 B1 | * | 4/2003 | Mannion | 711/2 |
| 6,622,227 B2 | * | 9/2003 | Zumkehr et al. | 711/167 |
| 6,678,838 B1 | * | 1/2004 | Magro | 714/42 |
| 2004/0205613 A1 | | 10/2004 | Li et al. | |

OTHER PUBLICATIONS

Vivek S. Pai et al, ACM Transactions on Computer Systems, IO-Lite: A Unified I/O Buffering and Caching System, Feb. 2000, vol. 18, pp. 37-66.*
"Rambus, Toshiba and Elpida Announce XDR DRAM, the World's Fastest Memory", 2003.*
Chris Connolly, "Restarting the Memory War", 2003.*
Chu et al., Write Buffer Design for On-Chip Cache, 1994, IEEE, 311-316.*

* cited by examiner

*Primary Examiner* — Edward Dudek, Jr.
*Assistant Examiner* — Ralph A Verderamo, III
(74) *Attorney, Agent, or Firm* — Stephen R. Tkacs; Stephen J. Walder, Jr.; Matthew B. Talpis

(57) ABSTRACT

A method, an apparatus, and a computer program are provided to account for data stored in Dynamic Random Access Memory (DRAM) write buffers. There is difficulty in tracking the data stored in DRAM write buffers. To alleviate the difficulty, a cache line list is employed. The cache line list is maintained in a memory controller, which is updated with data movement. This list allows for ease of maintenance of data without loss of consistency.

20 Claims, 6 Drawing Sheets

MEMORY CONTROLLER TO UTILIZE DRAM WRITE BUFFERS

FIELD OF THE INVENTION

The present invention relates generally to Dynamic Random Access Memory (DRAM) write buffers, and more particularly, to a memory controller that utilizes DRAM write buffers.

DESCRIPTION OF THE RELATED ART

In current DRAM designs, DRAMs often employ a single port to drive write data and sense read data. A bidirectional bus is used, and since the two different operations employ this resource, conflicts often occur within the recipient device. Thus, due to such conflict, delays will result on write to read turnarounds. Each delay then collectively contributes to poorer performance of the memory generally.

To combat the latencies associated with resource conflicts that result from write to read turnarounds, Extreme Data Rate (XDR™) DRAMs, which are available from Rambus, Inc., El Camino Real, Los Altos, Calif. 94022, can employ write buffers (WBs). The WBs allow the XDR™ DRAMs (XDRAMs), as well as some other DRAMs, to hold one or more cache lines in buffers, which are not actually written to the XDRAM cores. A cache line can be 128 bytes, but could be more or less depending on the implementation. The cache lines are stored in the WBs until instructed to be written to the XDRAM cores. The act of loading the WBs is called preloading, and the committing of the data to the XDRAM cores is called writing. A write command preloads the data for some future write while writing the oldest WB data to the address specified.

However, maintaining an accounting of the WBs by a memory controller can be difficult and require additional hardware. To complicate matters, the number and depth of WBs varies architecturally. Therefore, there is a need for a method and/or apparatus for maintaining an accounting by a memory controller of data stored within WBs with a reduced amount of additional hardware that addresses at least some of the problems associated with conventional method and/or apparatuses.

SUMMARY OF THE INVENTION

The present invention provides an apparatus, a method, and a computer program for utilizing Dynamic Random Access Memory (DRAM) write buffers in a memory system comprised of a plurality of DRAMs. As data is written to the write buffers, a list is generated in the memory controller. The list indicates which cache lines are pending in the DRAM WBs. Once generated, the list is stored in the memory controller for future use and can be updated.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
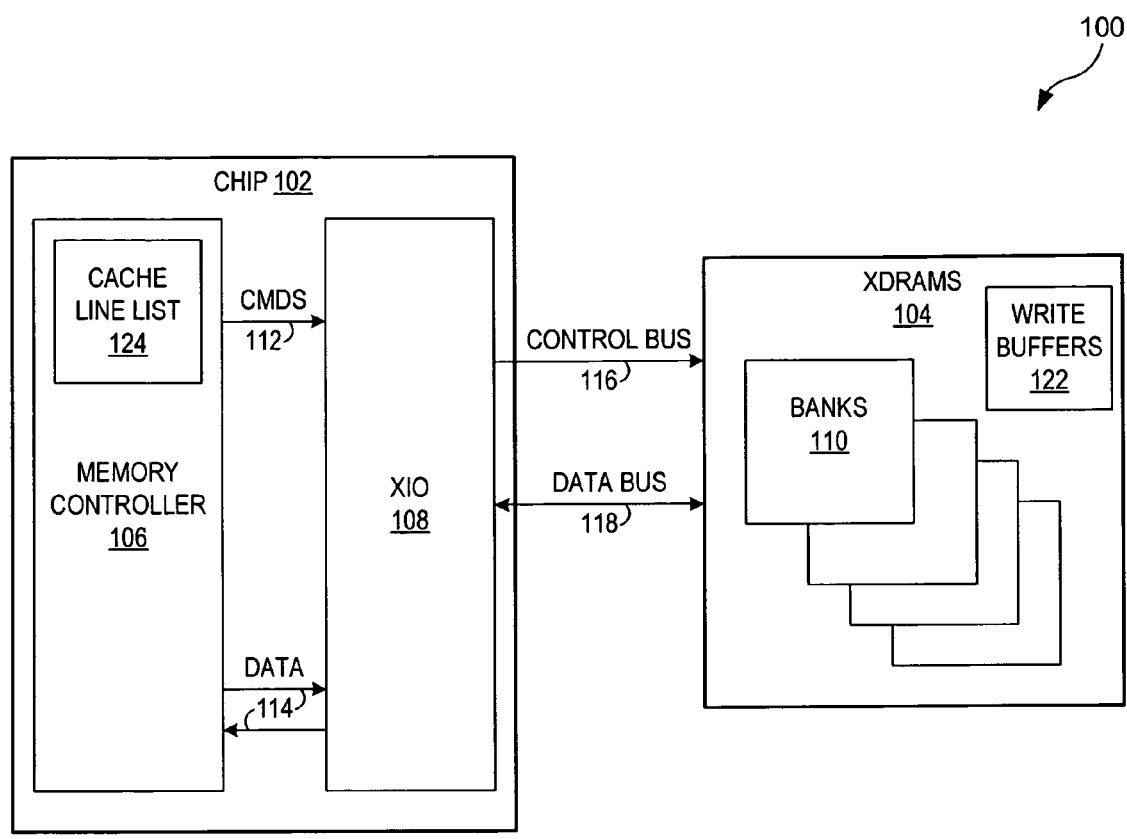
FIG. 1 is a block diagram depicting an XDR™ Memory system.

Referring to FIG. 1 of the drawings, the reference numeral 100 generally designates an XDR™ Memory system. The system 100 comprises a chip 102 and XDRAMs 104. The XDRAMs 104 comprise memory banks 110, WBs 122, and a high speed Input/Output (I/O) (not shown).

Traditionally, Synchronous DRAMs (SDRAMs) perform senses, precharges, and so forth in order to load and store data. XDRAMs, such as the XDRAMs 104, also employ many of the same operations and features common to various types of SDRAM. However, there are some significant differences between XDRAMs and other SDRAMs. For example, the XDRAMs employ differential signaling levels, where there is only a 200 mV difference between logic high and logic low to provide lower power consumption and higher switching speeds. XDRAMs also employ octal data rates to allow for 8 bits of data transmission during a clock cycle; therefore, data transmission for a 400 MHz clock would be 3.2 Gbps. Hence, additional control features are necessary to precisely operate and control the XDRAMs.

To control data, addresses, and commands sent to the XDRAMs, the chip 102 employs a number of on-chip components. Specifically, the chip 102 comprises a Memory Controller 106 and an XDR™ IO Cell (XIO) 108. Commands are communicated from the Memory Controller 106 to the XIO 108 through an internal command bus 112. The internal command bus 112 is unidirectional, allowing communication of commands and addresses from the Memory Controller 106. Additionally, data is communicated from the Memory Controller 106 and the XIO 108 through a pair of internal data buses 114. The internal bus data buses 114 are unidirectional and allow for data to be transmitted to the XIO 108 during store operations, while allowing data to be transmitted back to the Memory Controller 106 during load operations.

The Memory Controller 106 communicates with the WBs 122 via the XIO 108 to preload data. In other words, data can be preloaded into the WBs 122 without being written to the XDRAM 104 cores. However, maintaining an accounting of the data stored within WBs 122 is accomplished by utilizing a cache line list 124 incorporated into the Memory Controller 106.

Based on the information communicated between the memory controller 106 and the XIO 108, the XDRAMs 104 can be utilized. Control data passes from the XIO 108 to the XDRAMs 104 through an external, unidirectional control bus 116 that sends commands and addresses. Data is communicated between XIO 108 and the XDRAMs 104 through an external, bidirectional data bus 118.

Figure 2:
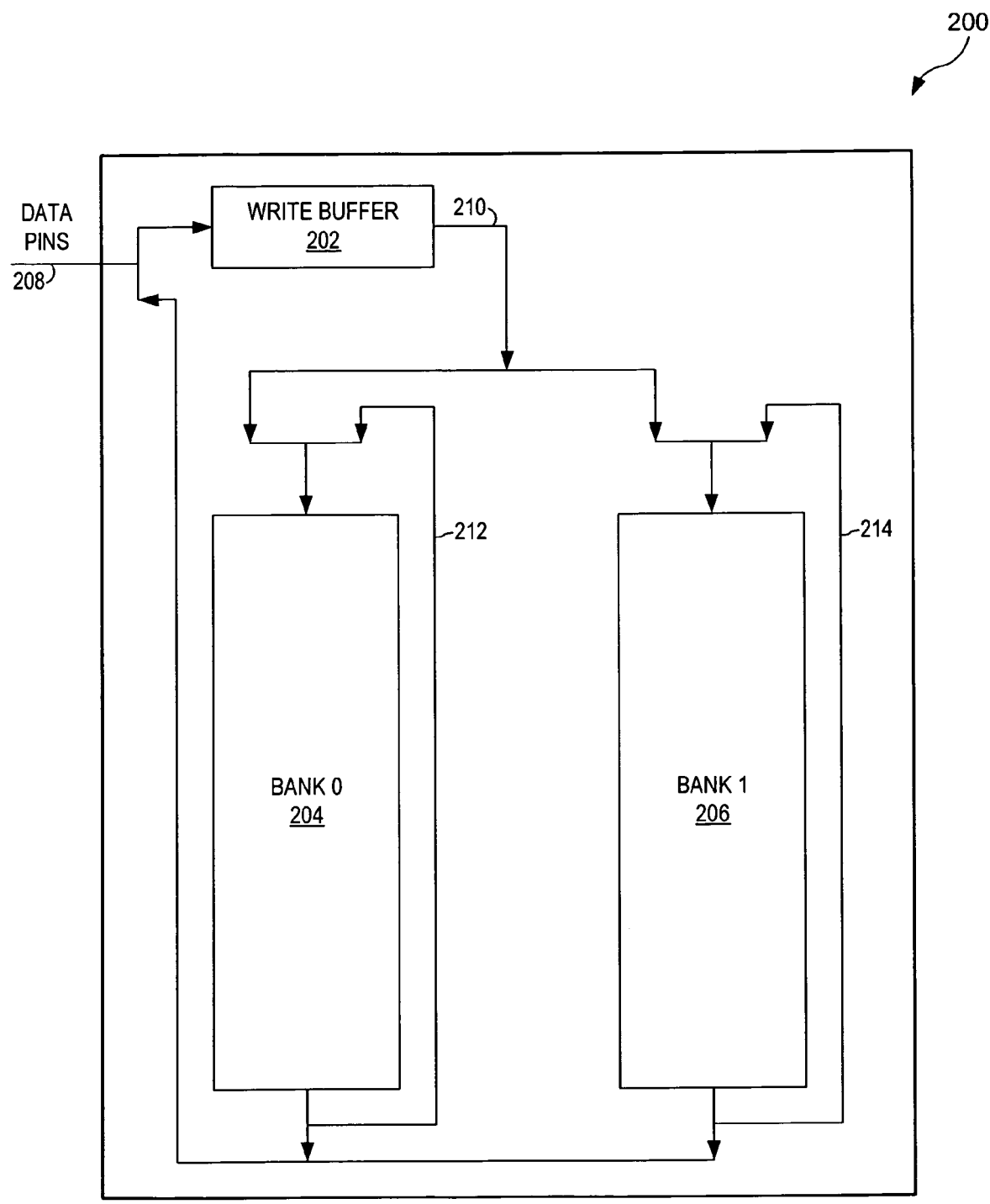
FIG. 2 is a conceptual block diagram depicting a simplified XDRAM.

The configuration of WBs 122 is such that data can be queued therein. Referring to FIG. 2 of the drawings, the reference numeral 200 generally designates a simplified XDRAM. The XDRAM 200 comprises the WBs 202, bank0 204, and bank1 206. Two banks are depicted in the XDRAM 200 for the purposes of illustration; however, there can be more banks. Typically, there are 4 to 16 banks.

Data from the XIO, such as the XIO 108 of FIG. 1, is communicated through the data pins 208. For a write operation, once the data is passed to the data pins 208, the WBs 202 relays data through the communication channel 210 to either bank0 204 or bank1 206. For a read operation, the banks 204 and 206 can output data to the data pins 208. The communication channels 212 and 214 are for restoring the contents of DRAM cells on a read, providing background data (typically the rest of the row) on a write, or for refreshing an entire row.

The XDRAM 200 operates by transmitting and receiving data through data pins 208. Write data is relayed to the WBs 202. From there, and under memory controller (not shown) control, the WBs 202 can provide either of the banks 204 and 206 with write data. Once data has been designated to be read from the memory core of the XDRAM 200, the data is transferred from one of the banks 204 and 206 to the data pins 208.

Figure 3:
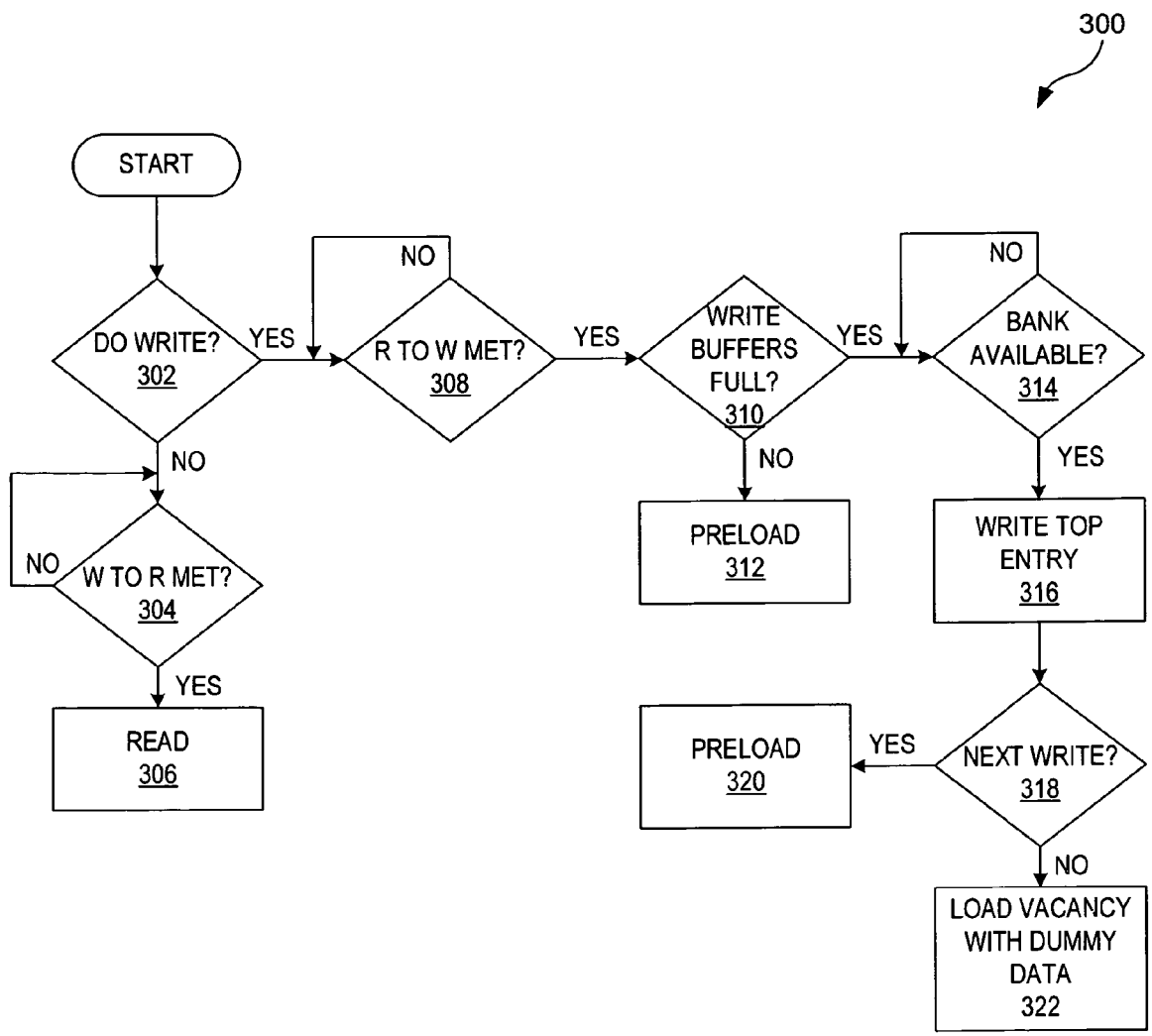
FIG. 3 is a flow chart depicting memory controller utilization of the XDRAM WBs.

The overall operation of the system 100, though, is complicated as a result of utilizing the WBs 122 (or the WBs 202). Referring to FIG. 3 of the drawings, the reference numeral 300 generally designates a flow chart depicting memory controller utilization of the XDRAM WBs.

When operations begin, there are no entries in the WBs 122 (202). WBs contain store data that is pending a write to the core. As a command is processed, a determination is then made in step 302 as to whether a write or a read is to be performed.

When a read operation is to be performed, steps to perform the read are taken. If the read is dependent on any write including those in the WBs 122, the read is stalled. If the read is not dependent on any writes, a determination is made as to whether the write to read turnaround is met in step 304. Once the write to read turnaround has been met (if the previous operation was a write), the read operations are performed in step 306.

If a write operation is to be performed, then different steps are employed. A determination is made as to whether the read to write turnaround has been met in step 308. This determination compares the last issued command to the desired command. At this point, the reads that are dependent on writes cause those writes to advance to the top of the queue. Then, a determination is made as to if the WBs 122 in step 310 is full. If the WBs 122 are not full, then data is preloaded into the WBs 122 in step 312.

If, on the other hand, the WBs 122 are full, the banks 110 are analyzed. A determination is made in step 314 as to whether the bank 110 with the oldest or top WB entry is available, where the memory controller 106 waits until the bank becomes available. Once available, the oldest WB entry is written to the banks 110 in step 316. While writing the top entry, a determination is made as to if there is an available write in step 318. If there is a next write, the associated data is preloaded to the WBs 122 in step 320. However, if there is not a next write, then dummy data is preloaded into the WBs 122 in step 322. Step 316 and step 320 or 322 are also performed at the same time and are accomplished by a single write.

By filling the list 124 with dummy entries, several objectives can be accomplished. During periods where the chip is idle, all data can be committed to DRAM cores. If there are no pending writes in the WBs, reads will not be dependent on them. Also, when the chip is idle, the banks will become available so that additional reads and writes can be done.

Figure 4A:
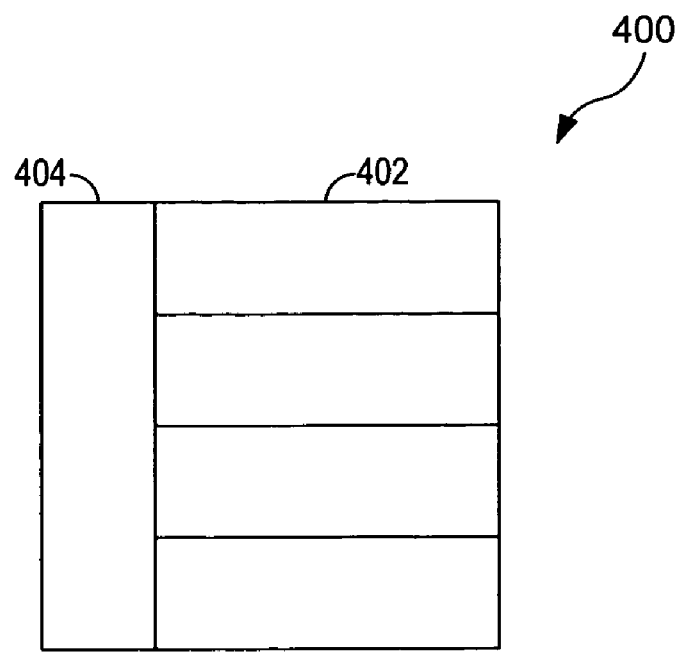
FIGS. 4A and 4B are block diagrams depicting the read and write queues.
Figure 4B:
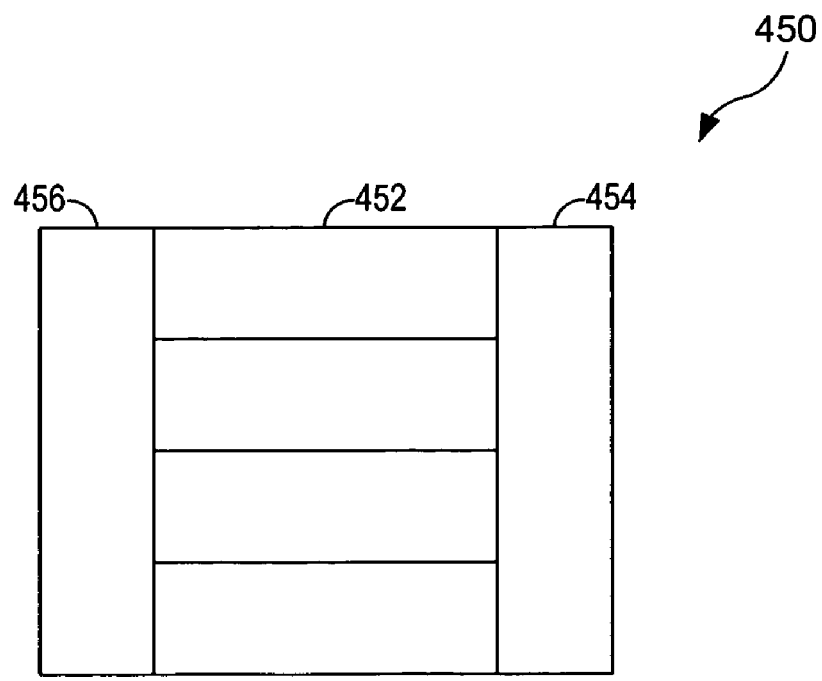

The operation used for reads and writes can be complicated, employing additional modifications to the respective queues. Referring to FIGS. 4A and 4B of the drawings, the reference numerals 400 and 450 generally designate a read queue and a write queue, respectively, that reside in the memory controller. The read queue 400 comprises a number of entry slots 402 and a dependency list 404 that denotes dependencies on write commands. The write queue 450 comprises a number of entry slots 452, a dependency list 456 that denotes dependencies on read commands, and a priority indication 454 that denotes priorities of write commands.

Figure 5:
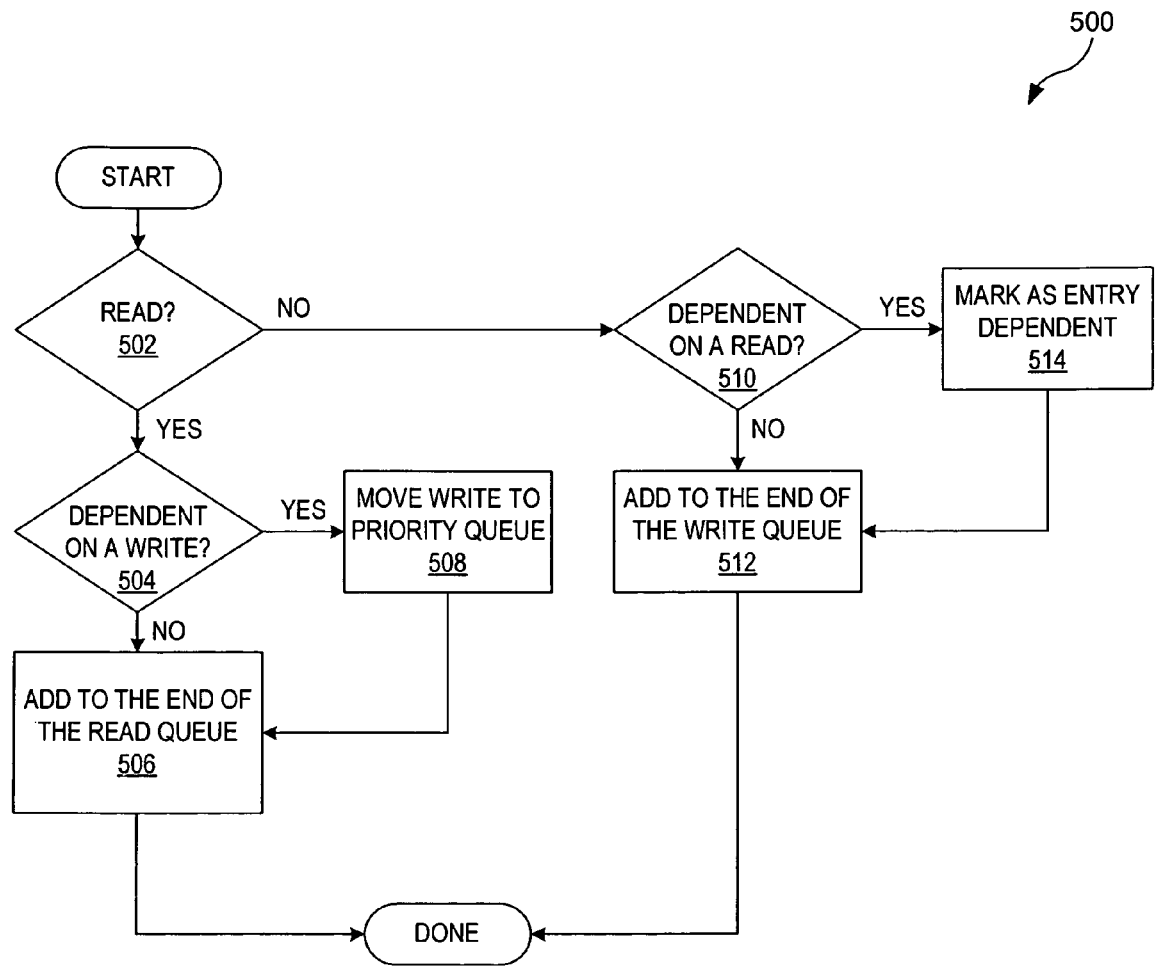
FIG. 5 is a flow chart depicting the operation of adding new entries to the list of commands to execute.

Referring to FIG. 5 of the drawings, the reference numeral 500 generally designates the addition of entries to the queues 400 and 450.

When a command is presented to the queues 400 and 450, a determination is made in step 502 as to whether the command or entry is a read command or a write command. If the command is a read command, then another determination is made in step 504 as to whether the new read command is dependent on a write entry, which is denoted in the write dependency list 404 of the read queue 400. Dependencies on write commands force an existing write command to execute before the new read command executes; therefore, if there is a write dependency, then the write is given a higher priority for execution in step 508 that is denoted in the priority indication 454 of the write queue 450, and then the read command is queued in step 506. If there is not a write dependency, then the read command is queued in step 506.

Under circumstances where the new command is not a read command, but is a write command, other steps are performed. Firstly, a determination is made in step 510 as to whether the new write command is dependent on a read command. If the new write command is dependent, then it is marked as dependent in the read dependency list 456 of the write queue 450 in step 514, and the write command is queued in step 512. If there is no read dependency, then the new write command is queued in step 512.

Figure 6:
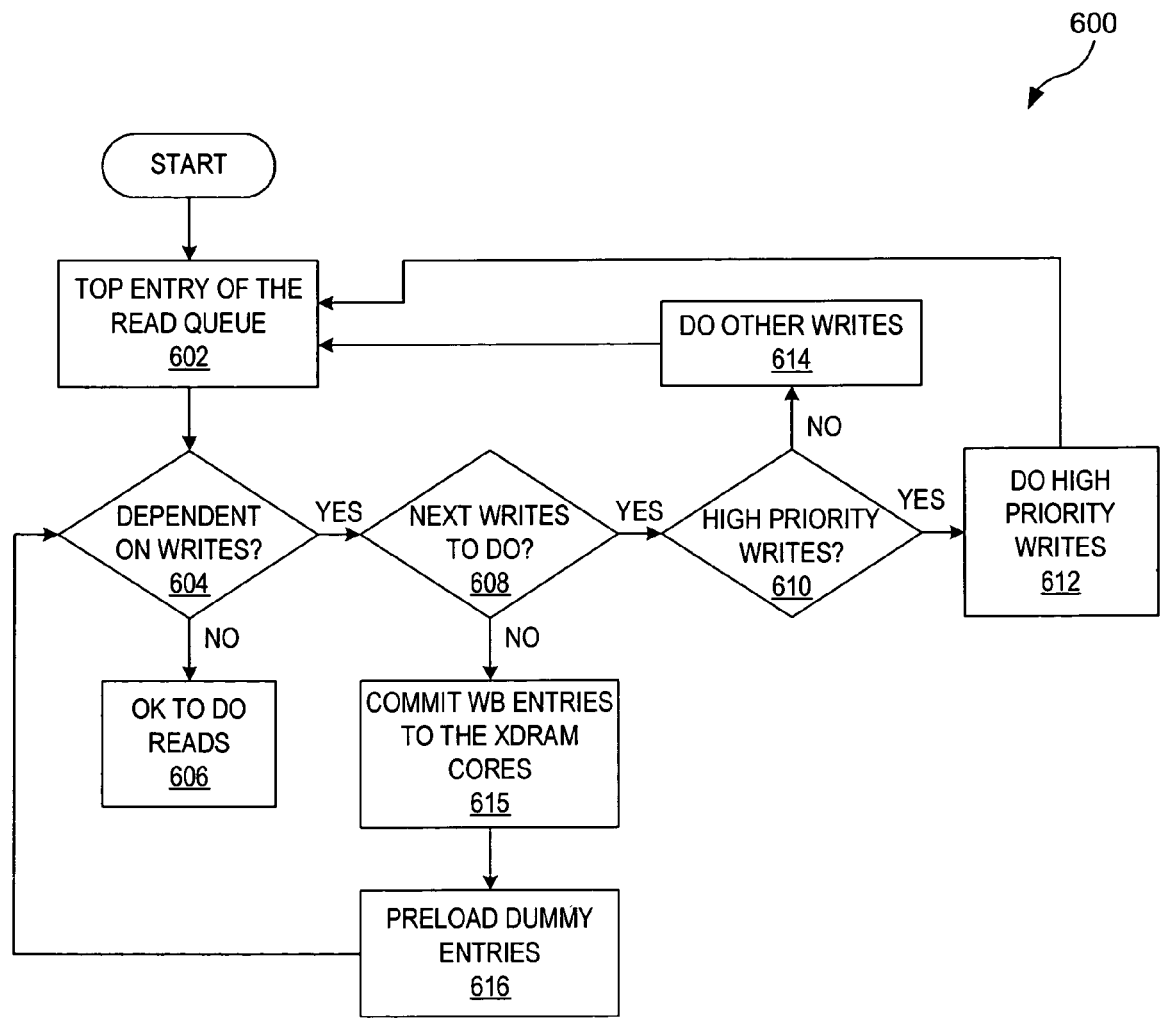
FIG. 6 is a flow chart depicting the execution of memory commands from read and write queues.

Referring to FIG. 6 of the drawings, the reference numeral 600 generally designates the execution of entries from the queues 400 and 450.

The top or oldest entry (command) of the read queue is examined in step 602. A determination is then made in step 604 as to whether the read command is dependent on any writes. If the read command is not dependent on any writes, then the read can be safely executed in step 606.

However, if dependencies do exist, then other steps are taken. Because the read is at the top of the queue, some device is waiting for the read to occur, and the read should be performed quickly. A determination is made in step 608 as to whether there are writes to be performed. If there are no next writes to be performed (meaning that the write queue is empty), then the read is dependent on a WB entry so the WB entries are committed to the XDRAM cores and dummy entries are preloaded in steps 615 and 616. Then, another determination is made in step 604 as to whether there are still any dependencies on writes. When there are no dependencies, the read is issued in step 606.

In cases where there are writes to be performed, then a determination of priority is made. In step 610, a determination is made as to whether there are any high priority writes. Those higher priority writes are performed one at a time in step 612. If there are no priority writes, the other writes are performed in step 614 (the read is dependent on an existing WB entry if there are no priority writes).

The use of dependency procedures allows for proper arbitration of limited resources and makes sure read-after-write and write-after-read consistency is adhered to. The arbitration can then efficiently allocate how data can be moved into and out of the XDRAMs. Therefore, the overall performance of the XDRAM memory system can be improved.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for implementing a system that employs at least one write buffer for a memory system, wherein the memory system comprises a plurality of Dynamic Random Access Memories (DRAMs) and a memory controller, the method comprising:
   preloading one or more cache lines into the at least one write buffer, wherein the plurality of DRAMs comprise the at least one write buffer;
   generating a list of which cache lines within the one or more cache lines are pending in the DRAMs; and
   storing the list in the memory controller.

2. The method of claim 1, wherein the method further comprises:
   determining if the at least one write buffer is full;
   preloading data to the at least one write buffer if the at least one write buffer is not full; and
   updating the list.

3. The method of claim 1, wherein the method further comprises:
   determining if the at least one write buffer is full;
   writing a top entry in a write queue to at least one DRAM of the plurality of DRAMs if the at least one write buffer is full; and
   updating the list.

4. The method of claim 1, wherein the method further comprises:
   transferring data from the at least one write buffer to at least one DRAM of the plurality of DRAMs;
   filling the list with dummy entries when there are no available writes to be executed.

5. The method of claim 1, further comprising:
   examining a top entry of a read queue;
   determining whether the top entry of the read queue depends on a write;
   if the top entry of the read queue depends on a write, determining whether there are write entries in a write queue.

6. The method of claim 5, further comprising:
   if there are no write entries in the write queue, committing writes in the at least one write buffer to the plurality of dynamic random access memories.

7. The method of claim 6, further comprising:
   responsive to committing writes in the at least one write buffer to the plurality of dynamic random access memories, preloading dummy entries into the at least one write buffer.

8. The method of claim 5, further comprising:
   if the top entry in the read queue depends on a write entry in the write queue, giving the write entry a higher priority for execution.

9. The method of claim 5, further comprising:
   if there are write entries in the write queue, determining whether there are high priority write entries in the write queue; and
   if there are high priority write entries in the write queue, performing write operations for the high priority write entries.

10. The method of claim 9, further comprising:
    if there are no high priority write entries in the write queue, performing write operations for the write entries in the write queue.

11. The method of claim 5, further comprising:
    if the top entry of the read queue does not depend on a write, performing a read operation for the top entry of the read queue.

12. A memory system comprising:
    a plurality of dynamic random access memories that are configured to have at least one write buffer; and
    a memory controller having a list to account for data preloaded into the at least one write buffer.

13. The memory system of claim 12, wherein the memory system further comprises an Input/Output Module that is configured to receive data and commands through at least one bus.

14. The memory system of claim 12, wherein the at least one write buffer further comprises:
    a plurality of banks for storing data; and
    a plurality of communication channels that enable the data to be transferred to and received from the plurality of banks through at least one data pin.

15. The memory system of claim 12, wherein the memory controller is at least configured to fill the list with dummy entries when there are no available writes to be executed.

16. The memory system of claim 12, wherein the at least one write buffer is configured to write stored data the plurality of dynamic random access memories when the at least one write buffer is full.

17. A memory system comprising:
    a dynamic random access memory comprising:
       at least one memory bank; and
       at least one write buffer;
    a memory controller comprising a cache line list,
    wherein the memory controller is configured to preload one or more cache lines into the at least one write buffer and maintaining and accounting for the one or more cache lines in the at least one write buffer using the cache line list.

18. The memory system of claim 17, wherein the memory controller is configured to examine a top entry of a read queue, determining whether the top entry of the read queue depends on a write, and if the top entry of the read queue depends on a write, determines whether there are write entries in a write queue.

19. The memory system of claim 18, wherein if there are no write entries in the write queue, the memory controller is configured to commit writes in the at least one write buffer to the at least one memory bank.

20. The memory system of claim 18, wherein if the top entry in the read queue depends on a write entry in the write queue, the memory controller is configured to give the write entry a higher priority for execution.

* * * * *